United States Patent [19]

Morris et al.

[11] 4,043,180

[45] Aug. 23, 1977

[54] GATHERING LINE LEAK DETECTION SYSTEM TESTER

[75] Inventors: David A. Morris; Norman E. Flournoy, both of Richmond; Thomas W. Langley, Bon Air, all of Va.

[73] Assignee: Texaco Inc., New York, N.Y.

[21] Appl. No.: 639,547

[22] Filed: Dec. 10, 1975

[51] Int. Cl.² .................... G01M 3/00; G08B 29/00
[52] U.S. Cl. ............................... 73/40.5 A; 73/1 R; 340/410
[58] Field of Search .............. 73/40.5 A, 1 R; 307/40; 340/147 C, 410

[56] References Cited

U.S. PATENT DOCUMENTS

| | | | |
|---|---|---|---|
| 3,264,864 | 8/1966 | Reid et al. | 73/40.5 A X |
| 3,441,744 | 4/1969 | Noble | 307/40 |
| 3,487,397 | 12/1969 | Kaplan et al. | 340/410 X |
| 3,670,303 | 6/1972 | Dame | 340/147 C X |
| 3,676,849 | 7/1972 | Malandro et al. | 340/146.2 X |
| 3,740,718 | 6/1973 | Melvin, Jr. | 340/147 C X |
| 3,894,247 | 7/1975 | DeJong | 307/247 A X |
| 3,920,926 | 11/1975 | Lenaerts et al. | 307/247 A X |

*Primary Examiner*—Richard C. Queisser
*Assistant Examiner*—John S. Appleman
*Attorney, Agent, or Firm*—Thomas H. Whaley; Carl G. Ries; Henry C. Dearborn

[57] ABSTRACT

A system employing a plurality of electronic oscillators for generating test signals at spaced locations remote from a selection point. The oscillators are coupled to a gathering line for petroleum products, each being located adjacent to an acoustic detector coupled to the line for signaling the presence of a leak within its range. A digital selector which manually generates a given number of pulses is located at the selection point. There is a binary counter at each oscillator to receive the pulses. And, there is also a binary encoder at each oscillator to determine which one will be energized, depending upon the number of pulses generated by the selector.

6 Claims, 2 Drawing Figures

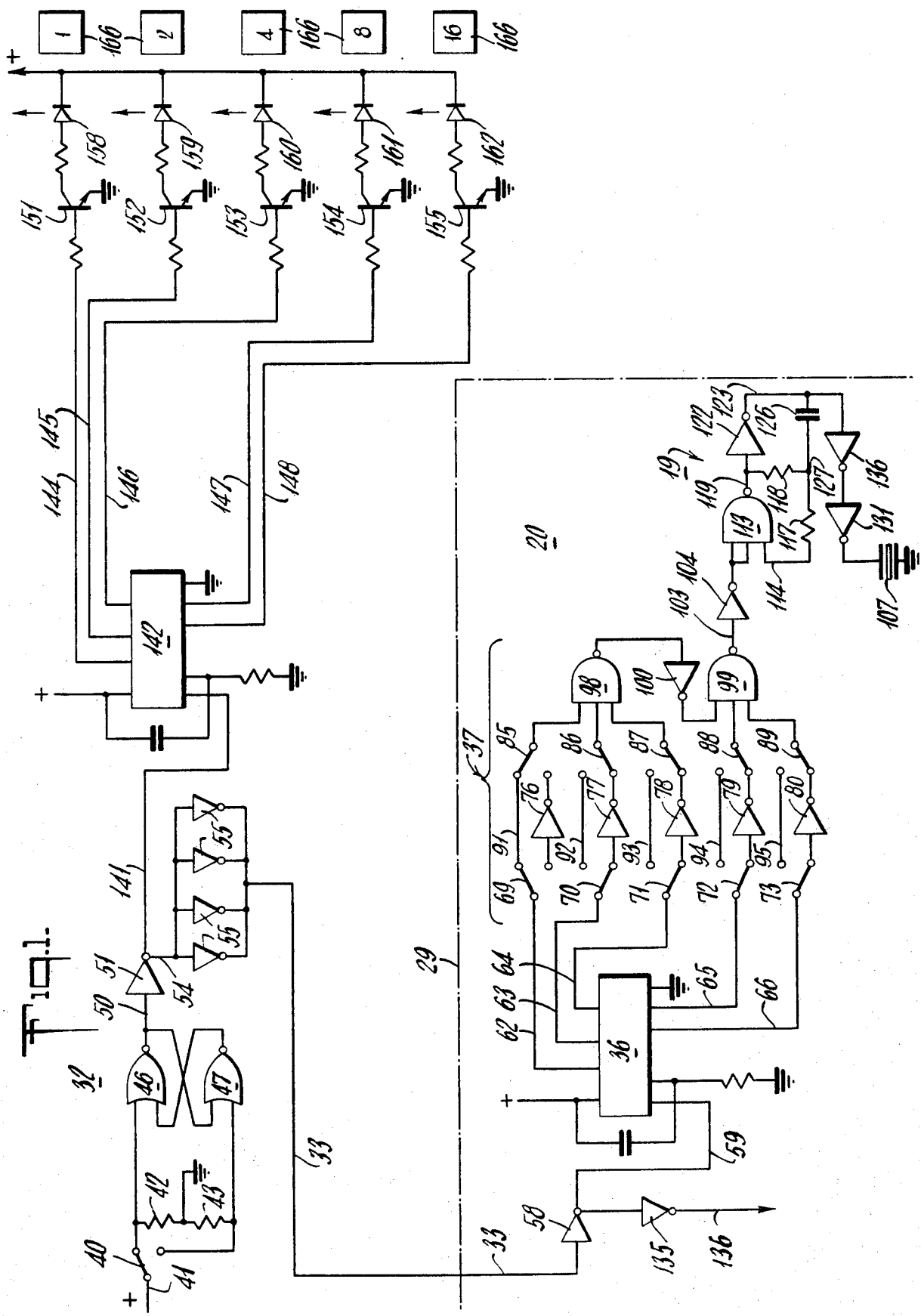

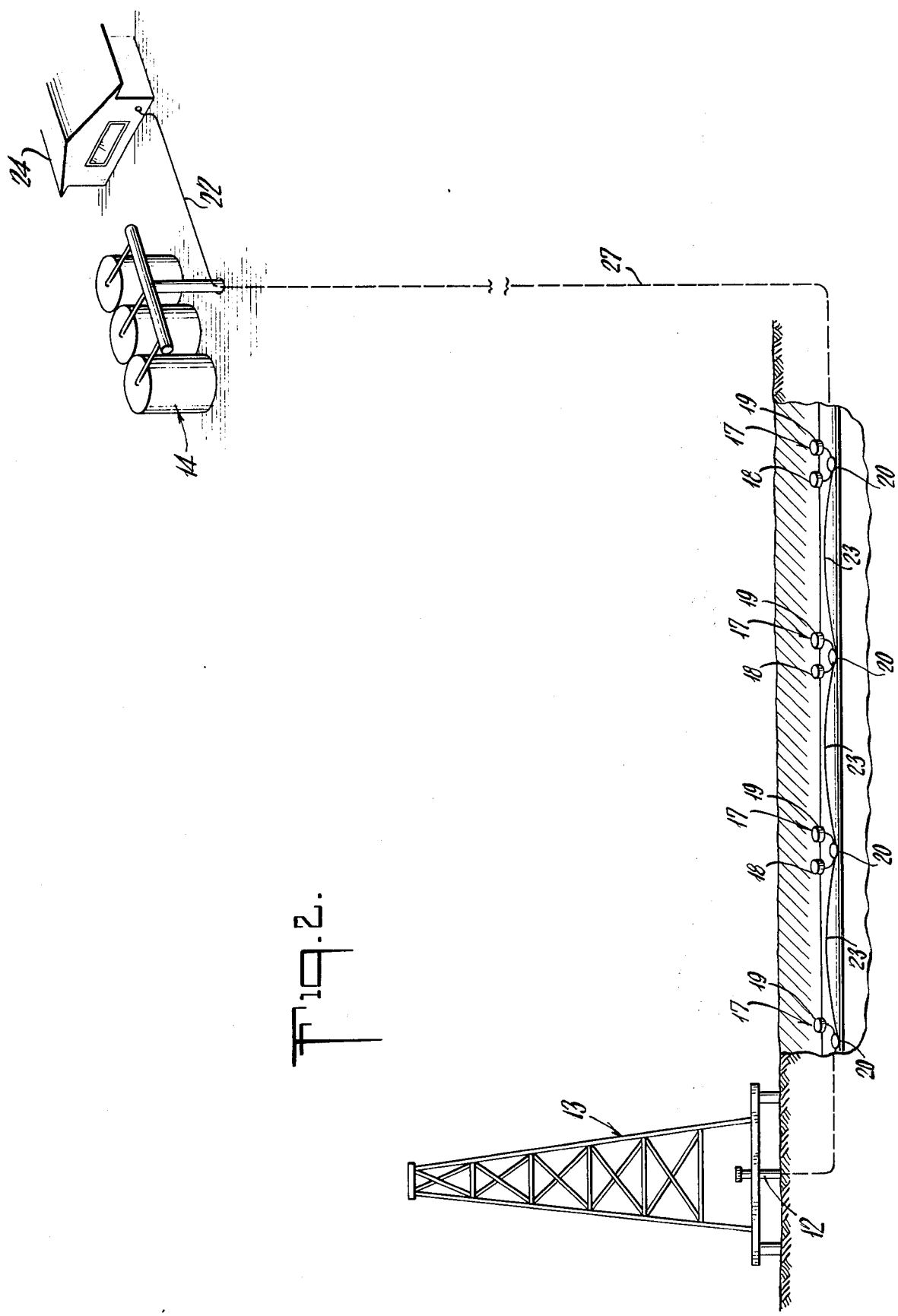

GATHERING LINE LEAK DETECTION SYSTEM TESTER

CROSS-REFERENCE TO RELATED APPLICATION

A co-pending application Ser. No. 588,928 filed June 20, 1975 discloses a leak detection unit that includes an oscillator and a detector. That unit illustrates details of one type which may be employed as the leak detection units in the system according to this invention.

BACKGROUND OF THE INVENTION

1. Field of the Invention

This invention concerns a system for selectively actuating one of a plurality of oscillators which are remotely located from a selection point. More specifically, it deals with a selective actuating system which is particularly employed in connection with a gathering-line leak detection system for petroleum product handling. The arrangement is made for producing a test signal at some particular location upon command in order to determine the operatability of a given leak detector of the system.

2. Description of the Prior Art

While one aspect of the invention may have general utility, the invention is of particular concern for use in creating test signals in a leak detection system that is applied to petroleum product gathering-lines or the like.

Heretofore, so far as is known, there has been no use made of a leak detection system that has a number of leak detector units applied spread apart and mounted permanently on a product handling line. And, in connection with a leak detection system of that sort, it is important to be able to test for operatability, the individual ones of the detector permanently mounted along the line. However, such line is ordinarily buried underground and consequently the detectors are likewise buried and quite inaccessible. Therefore, in order to create a known signal that simulates a leak signal for determining the operatability of each leak detector, an arrangement is needed that is in accordance with this invention. It provides for an oscillator to generate the simulated leak signal located adjacent to each detector. In addition, the system provides an arrangement for actuating each oscillator, as desired, while being able to identify the oscillator being actuated so that the particular detector being tested is positively identified.

Thus, it is an object of this invention to provide a system for selectively actuating one of a plurality of oscillators that are remotely located from a selection point.

Another object of the invention is to provide in combination with gathering lines for petroleum products, a plurality of leak detectors coupled to the line and spaced apart there along while also including an oscillator adjacent to each detector. The system includes means to select and identify which oscillator is actuated.

SUMMARY OF THE INVENTION

Briefly, the invention concerns a system for selectively activating one of a plurality of oscillators remotely located from a selection point. It comprises in combination digital selector means for producing a predetermined number of pulses, and circuit means for delivering said pulses to said plurality of oscillators. Each of said oscillators has a binary counter associated therewith, and the system also comprises binary encoded means for energizing each of said oscillators upon receipt of a predetermined number of said pulses at said associated binary counter.

Again briefly, the invention concerns a system that is in combination with a gathering line for petroleum products wherein said gathering line is subject to developing one or more leaks there along. The said gathering line has a plurality of leak detectors coupled thereto and spaced there along for detecting and locating a leak. An oscillator is associated with each of said leak detectors for testing whether said detector is operative. And, the system concerns means for selecting and identifying which of said oscillators is activated.

Once more briefly, the invention is in combination with a gathering line for petroleum products wherein said gathering line is subject to developing one or more leaks there along. The said gathering line has a plurality of acoustic leak detectors directly coupled thereto and spaced at predetermined intervals there along for detecting and locating a leak. An acoustic oscillator is associated with each of said leak detectors and coupled to said gathering line adjacent to each detector for testing whether said detector is operative. And, the combination comprises means for selecting and identifying which of said oscillators is activated. The said means comprises means for producing a predetermined number of pulses, including a bi-stable multivibrator and a manual switch for shifting said multivibrator from one state to the other. It also comprises a binary counter associated with each of said oscillators for providing binary type output signals in accordance with said number of pulses, and binary encoded means associated with each of said oscillators including selectable alternative circuits for said binary type output signals. It also comprises first circuit means for connecting said binary type output signals to said selectable alternative circuits, and second circuit means for connecting said selectable alternative circuits to a pair of interconnected NAND gates for energizing said oscillator.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a schematic circuit diagram illustrating the system for selectively activating and indicating a particular oscillator; and FIG. 2 is a schematic illustration showing a petroleum product gathering line, with leak detectors and associated oscillators in place there along.

DESCRIPTION OF THE PREFERRED EMBODIMENT

In regard to one aspect of the invention, it may have some broader application. However, it is also particularly applicable to and concerns a leak detection system. Such system is especially applicable to petroleum product gathering lines. Thus, with reference to FIG. 2, it will be observed that there is illustrated in a schematic manner an oil field system. It includes a gathering line or pipe 11 which connects a well 12 (shown under a derrick 13) with a centerally located set of storage tanks 14.

Spaced at predetermined intervals along the pipe 11, there are leak detection units 17 which are permanently attached to the pipe 11. Each of the units 17 includes a detector 18 in addition to an oscillator 19. As indicated by the above noted co-pending application, such a unit may be made up so as to include a unitary package 20 for containing the electronic circuitry involved.

Thus, the schematic indication of the detectors 18 represents the crystal detector element of each, while similarly, the symbols indicating the oscillators 19 as shown in FIG. 2 represent the crystal elements of the oscillators. Electrical connections are made from the crystal 18 and 19 to the packages 20, as schematically indicated. Furthermore, it may be noted that each unit 17 is connected in a series which includes interconnecting electrical circuitry. This is indicated by a series of lines 23 which interconnect the units 17. Also, at the end of the circuit there is a circuit connection 22 that goes to a central location e.g. a field house structure 24.

It will be appreciated that in FIG. 2 the showing of a dashed line 27 indicates the continuation of the pipeline 11 with leak detection units 17 attached thereto. Also the interconnecting electrical circuitry 23 continues there along and leaves the pipeline via the connection 22 to go to a central location, e.g. the field house 24.

When the gathering line, or pipe 11 is installed (usually underground) it will have a series of the leak detection units 17 permanently attached thereto. As indicated above, these units 17 each have an acoustic detector 18 which includes a piezoelectric crystal that will be actuated by signals generated by leaks in the pipe. However, the detector units 18 are each only sufficiently sensitive to cover a relatively short distance along the pipe 11 and consequently they will be mounted spaced apart with enough distance to make some overlap and thus cover the entire length of the pipe 11. Furthermore, since these units are thus permanently mounted and buried underground, they are substantially inaccessible. And, this invention provides for a means of testing periodically to determine whether each individual detector unit is in operating condition.

The foregoing testing involves the oscillators 19 each of which includes a crystal for generating the desired acoustic signal and applying it to the pipe 11. In this manner the corresponding detector 18 will have a synthetic or simulated leak signal that will be indicated by that detector if it is in operating condition. As this testing is done at each unit, it is of course important to be able to determine which of the units is being tested so that when a malfunction is indicated the particular unit will be indicated and may be directly located. That aspect of the invention will be described in greater detail below.

With particular reference to the FIG. 1 circuit diagram, the elements of a system for selectively activating one of the plurality of oscillators will now be described. It may be noted that FIG. 1 has a dashed line 29 which divides the circuit diagram into two parts. The portion above and to the right of dashed line 29, illustrates the elements that are located at a selection point, e.g. in the house 24 illustrated in FIG. 2. On the other hand, the elements below and to the left of the dashed line 29 are those illustrating one of the oscillators and its test signal output transducer. This indicates the elements in one of the series of packages 20 illustrated in FIG. 2.

At the selection point (in house 24) there is a digital selector means 32. This delivers manually created pulses over a circuit wire 33 to all of the oscillators 19 via all of the packages 20.

In each package 20 there is a binary counter 36 and a binary encoded circuit means 37 that delivers an output pulse to the input of the selected oscillator 19. It will be appreciated that each of the oscillators 19 which are located along the pipe 11 will include all the elements incorporating the binary counter 36 and the encoded means 37.

The selector means 32 is made up of a manual switch 40 that connects a source of potential 41 to one of the ends of a pair of resistors 42 and 43, that have the other ends of each connected in common to ground, as illustrated. There are a pair of NOR gates 46 and 47, which are cross connected as illustrated. One input of each is connected to the ungrounded end of the corresponding resistor 42 and 43, and the output of each gate is connected to the other input of the opposite gate. This makes up a bistable multivibrator circuit which then produces an output pulse each time the multivibrator switches over and back. And, the pulse is carried on a circuit connection 50 that goes to the input of an inverter 51. It will be appreciated that these elements may be made up of solid state electronic units such as are available commercially.

The inverted pulses at the output of inverter 51 travel over a circuit connection 54 to inputs of a group of four inverters 55. These inverters are connected in parallel in order to add adequate power for transmission of the pulses over the circuit connection 33.

At each oscillator 19 there is another inverter or buffer element 58 which is used to shape the input pulse being applied to the digital counter element 36. It will be appreciated that the counter element 36 may be a commercially available integrated circuit which is designed for use in this manner and which has an input circuit for receiving pulses to be counted. There is a circuit connection 59 that leads from the output of the buffer 58 to the counter 36 input.

It will also be understood that the counter 36 is a binary type counter which has five separate output circuits 62, 63, 64, 65 and 66. These outputs carry signals that represent a "one" or a "zero" for the binary representations of the numbers 1, 2, 4, 8 and 16, in a conventional manner. Output circuits 62-66 are connected to a group of manual switches 69-73, which may be set to either of two alternative positions in order to either make a direct connection or to connect the corresponding circuit to the input of the corresponding one of a group of inverters 76-80, respectively.

The output side of inverters 76-80 are connected to one of alternative terminals of another group of switches 85-89. It will be appreciated that these switches 85-89 will be set in conjunction with the corresponding switches 69-73 in order to encode the binary encoded means 37. This is accomplished connecting appropriate ones of the output circuits 62-66 (from the binary counter 36) to one of the inverters 76-80 or to one of a corresponding series of direct circuit connections 91-95 in the alternative. Of course, the corresponding pairs of switches 69-85, 70-86, etc. may be ganged for simultaneous switching if desired.

The logic of encoding a desired number into the encoded means 37, is obtained at the output of the alternative switch connections from the switches 85-89. It is accomplished by employing two NAND gates 98 and 99 in addition to an inverter 100. As will be explained in more detail, an output signal will be developed at a connection 103 on the output of NAND gate 99, only when the number that has been encoded by the setting of switches 69–73 and 85–89 appears. Such signal is carried via an inverter 104 to the input of the oscillator 19. And, the oscillator has an output that energizes a crystal 107. m The elements of the oscillator 19 are similar to those shown and described in connection with the oscillator portion of the unit in the above noted co-pending application. Specifically (in this application) with reference to FIG. 1, the elements include a NAND gate 113 that has two of its three inputs connected in parallel to the output of the inverter 104. It has a third input connection 114 that is connected to one end of a resistor 117 which has the other end thereof connected to an end of another resistor 118. Resistor 118 has its other end connected to an output connection 119 from the NAND gate 113.

The circuit connection 119 also goes to the input of an inverter 122 which has an output connection 123 that goes to one side of a capacitor 126. The other side of capacitor 126 is connected to a common connection point 127 between the resistors 117 and 118.

The output of the oscillator 19 goes via a series of two inverters or buffers 130 and 131 to one electrode of the crystal 107. Of course, the other electrode of the crystal 107 will be grounded, as illustrated.

As has been indicated above, all of the oscillators 19 (FIG. 2) are connected in parallel electrically so that the number of pulses which are being generated at the selector 32 by manipulation of the switch 40, will be transmitted to all of the oscillators 19 in parallel. However, only the one which has been encoded for a particular number of pulses, will be activated when that number has been transmitted. The parallel circuits include an inverter 135 and a continuing circuit connection 136.

At the selection point (selector means 32) there is another output circuit connection 141 that goes to the input of another binary counter 142. This counter has the same conventional binary type output circuits 144–148 which represent the arabic numbers 1, 2, 4, 8 and 16 respectively. This counter 142 is included at the location of the selector means 32 in order to provide a visual indication of the number that has been transmitted by the selector. There are a plurality of transistors 151–155 which have light emitting diodes 158–162 that are connected to a voltage source via a common connection 164. Consequently, when the corresponding transistor 151–155 is energized, one or more of the binary indicator lights 166 will be illuminated.

As an example of the operation of the system shown in FIG. 1, it may be considered that a number 1 pulse indication is transmitted. This would be done in order to turn on a particular oscillator 19 which has been encoded to accept that number. Thus, when the switch 40 is actuated to its other position (from that illustrated) for creating a single pulse, the bistable multivibrator that is made up of the NOR gates 46 and 47 will be switched from a "low" to a "high" state at the input of the inverter 51. Consequently, the output side of the inverter 51 will change from high to low, and the output of parallel inverters 55 will be re-inverted from low to high on the connection 33.

The inverter 58 located at the test package 20, once more inverts while shaping the pulse after traveling through the circuit wire 33. Thus it provides a low signal on connection 59 into the binary counter 36. This switches the output signal level on circuit connection 62 to a high while the output on connections 63 and 64 remain low along with the outputs on circuit connections 65 and 66 from the counter, which also will remain low.

In the encoded section 37 of the package circuit 20, the signals are treated by the settings of the switches 69–73 and 85–89 in order to provide an output that is predetermined for a given pulse count. In this case, upon the receipt of a single pulse count, the oscillator 19 will be energized. Such output maybe traced by following conditions within the circuits that involve the inverters 76–80.

The last four inverters 77–80 are connected to the circuits 63–66 respectively, from outputs of the counter 36. Consequently, each of these low signals is transformed to a high signal at the corresponding inputs of the NAND gates 98 and 99. By reason of the logical action inherent in NAND gates 98, when all three of its inputs are high it will provide an output that is low. Such output then is inverted by the inverter 100 to provide a high input signal to NAND gate 99. The other two inputs to NAND gate 99 will both be high because of the inverters 79 and 80 as indicated above, so that there will be an output signal from gate 99 which is a low on circuit connection 103.

Thereafter the inverter 104 will transform the low to a high signal at the common pair of inputs to the NAND gate 113. Thus, the oscillator 19 which includes the interconnections shown including the capacitor 126 and the feedback resistor connections 117 and 118, will cause oscillations at a predetermined frequency. The oscillation signals are applied via the inverters 130 and 131 to the crystal 107 for generating the desired acoustic signal on the line 11.

It will be appreciated that simultaneously as the single pulse is transmitted from the selector means 32, the signal from inverter 51 will also be applied via the circuit connection 141 to the input of the binary counter 142. Consequently, the output circuit 144 (representing a number 1) will be energized and this will trigger the transistor 151 to thus energize the diode 158. As indicated, this will cause a visual indication for a number 1. It will be understood, of course, that the visual indications are in binary form. Consequently, as the various indicator lights are illuminated, they must be interpreted in light of that fact in order to determine the arabic number which is indicated. In other words, for example, a number 20 would be shown when the corresponding indicator lights 166 are energized by the diodes 160 and 162.

It will be appreciated that appropriate ones of the various elements of the foregoing circuit arrangement, may be made up using integrated circuit elements that are commercially available from different manufacturers.

While a particular embodiment of the invention has been described above in considerable detail, in accordance with the applicable statutes, this is not to be taken as in any way limiting the invention but merely are being descriptive thereof.

We claim:

1. In combination with a gathering line for petroleum products wherein said gathering line is subject to developing one or more leaks there along,
   said gathering line having a plurality of leak detectors permanently coupled thereto and spaced there along for detecting and locating a leak,
   an oscillator permanently attached to said gathering line and associated with each of said leak detectors for testing whether said detector is operative, and means for selectively activating each of said oscillators and identifying which of said oscillators is activated.

2. The invention according to claim 1, wherein said means for selecting and identifying, comprises
means for producing a predetermined number of pulses,
a binary counter associated with each of said oscillators,
binary encoded means associated with each of said oscillators, and
circuit means for delivering said pulses to said binary counters and from said counters to said binary encoded means for energizing said selected one of said oscillators.

3. The invention according to claim 2, wherein said means for producing a predetermined number of pulses, comprises a bistable multivibrator and a manual switch for shifting said multivibrator from one state to the other.

4. The invention according to claim 3, wherein said means for selecting and identifying, also comprises
a control station, and
another binary counter at said control station for identifying which of said oscillators is being energized.

5. The invention according to claim 4, wherein said means for selecting and identifying, also comprises
visual indicator means actuated by said another binary counter at said control station.

6. In combination with a gathering line for petroleum products wherein said gathering line is subject to developing one or more leaks there along,
said gathering line having a plurality of acoustic leak detectors directly coupled thereto and spaced at predetermined intervals there along for detecting and locating a leak,
an acoustic oscillator permanently attached to said gathering line and associated with each of said leak detectors and coupled to said gathering line adjacent to each detector for testing whether said detector is operative, and
means for selectively activating each of said oscillators and identifying which of said oscillators is activated, comprising
means for producing a predetermined number of pulses, including a bistable multivibrator and a manual switch for shifting said multivibrator from one state to the other,
a binary counter associated with each of said oscillators for providing binary type output signals in accordance with said number of pulses,
binary encoded means associated with each of said oscillators including selectable alternative circuits for said binary type output signals,
first circuit means for connecting said binary type output signal producing means to said selectable alternative circuits, and
second circuit means for connecting said selectable alternative circuits to a pair of interconnected NAND gates for energizing said oscillator.

* * * * *